(12) United States Patent
Dutov et al.

(10) Patent No.: US 6,856,639 B2
(45) Date of Patent: Feb. 15, 2005

(54) HIGH POWER SLAB TYPE GAS LASER

(75) Inventors: Alexander Ivanovich Dutov, St. Petersburg (RU); Victor Semenov, St. Petersburg (RU); Alexey A. Kuleshov, Petrodvorets St. Petersburg (RU); Nikolay A. Novoselov, Str. Petersburg (RU); Alexander A. Sokolov, St. Petersburg (RU)

(73) Assignees: Gosudarstvennoye Predpriyatie Nauchnoissledovatelsky Institut Lazernoy Fiziki, St. Petersburg (RU); Amada Company, Limited, Kanagawa-ken (JP)

( * ) Notice: Subject to any disclaimer, the term of this patent is extended or adjusted under 35 U.S.C. 154(b) by 80 days.

(21) Appl. No.: 10/306,736

(22) Filed: Nov. 29, 2002

(65) Prior Publication Data

US 2004/0105477 A1 Jun. 3, 2004

(51) Int. Cl.[7] .................................................. H01S 3/03
(52) U.S. Cl. ............................ 372/61; 372/55; 372/56; 372/57; 372/92; 372/99
(58) Field of Search ............................... 372/55–57, 61, 372/92, 99

(56) References Cited

U.S. PATENT DOCUMENTS

| | | | | | |
|---|---|---|---|---|---|
| 4,714,902 | A | * | 12/1987 | Rokni et al. ................. | 359/244 |
| 5,014,282 | A | * | 5/1991 | Herziger et al. .............. | 372/93 |
| 5,123,028 | A | | 6/1992 | Hobart et al. | |
| 5,506,858 | A | * | 4/1996 | Takenaka et al. ............. | 372/92 |
| 5,586,139 | A | * | 12/1996 | Takenaka et al. ............. | 372/99 |
| 5,684,822 | A | * | 11/1997 | Partlo .......................... | 372/95 |
| 6,198,758 | B1 | * | 3/2001 | Broderick et al. ............ | 372/36 |
| 6,256,332 | B1 | * | 7/2001 | Anikitchev ................... | 372/93 |
| 6,442,186 | B1 | * | 8/2002 | Vitruk .......................... | 372/95 |
| 6,442,187 | B1 | * | 8/2002 | Dutov et al. ................. | 372/101 |
| 6,526,086 | B1 | * | 2/2003 | Wakabayashi et al. ........ | 372/69 |
| 6,603,794 | B2 | * | 8/2003 | Bethel et al. ................. | 372/98 |

OTHER PUBLICATIONS

"Area Scaling Boosts $CO_2$ Laser Performance" by D.R. Hall et al., Laser Focus World, vol. 25, No. 10, pp. 77–80, 1989.
"High Power $CO_2$ Waveguide Laser of the 1 kW Category" by R. Novak et al., Proc. SPIE, 1276, $CO_2$ Lasers and Applications, II, pp. 18–26, 1990.
"Planar Waveguide, 1 kW Cw Carbon Dioxide Laser Excited by a Single Transverse RF–Discharge" by H.D. Collay et al., Applied Physics Letters, vol. 61, No. 2, pp. 136–139, 1992.
"700 Watt Diffusion Cooled, Large Area, 40.68 MHz Excited $CO_2$ Laser Employing Split Wave Hybrid Confocal Resonator", by P. Vitruk et al., Proc. SPIE, 3343, pp. 677–686, 1989.

(List continued on next page.)

*Primary Examiner*—Minsun Oh Harvey
*Assistant Examiner*—Delma R. Flores-Ruiz
(74) *Attorney, Agent, or Firm*—Greenblum & Bernstein, P.L.C.

(57) ABSTRACT

A gas laser comprises a pair of elongated electrodes arranged to define a discharge region between two opposing surfaces of said elongated electrodes, wherein the discharge region defines a longitudinal axis, a wide axis and a narrow axis. The gas laser further includes a lasing gas disposed in said discharge region and an excitation means for energizing the electrodes to excite the lasing gas. A first mirror is arranged in front of a first end of the pair of elongated electrodes, wherein the first mirror is spaced apart from the first end along the longitudinal axis by a first distance, and a second mirror is arranged in front of a second end of the pair of elongated electrodes. Moreover, the two opposing electrode surfaces define an electrode curvature, respectively, that is adapted such that a wave front of the a fundamental transverse radiation mode with respect to the narrow axis substantially coincides with a mirror curvature of the first mirror at the first distance.

32 Claims, 9 Drawing Sheets

OTHER PUBLICATIONS

"The Characteristics and Stability of High Power Transverse Radio Frequency Discharges for Waveguide $CO_2$ Slab Laser Excitation", by P. Vitruck et al., Applied Physics, vol. 25, pp. 1767–1776, 1992.

"Mode Calculations in Unstable Resonators with Flowing Saturable Gain. Fast Fourier Transform Method" by A.E. Sigman et al., Applied Optics, vol. 14, No. 8, pp. 1874–1899, 1975.

"Laser Optics 2000: High Power Gas Lasers", Proc. SPIE, vol. 4351, paper 4531–13.

* cited by examiner

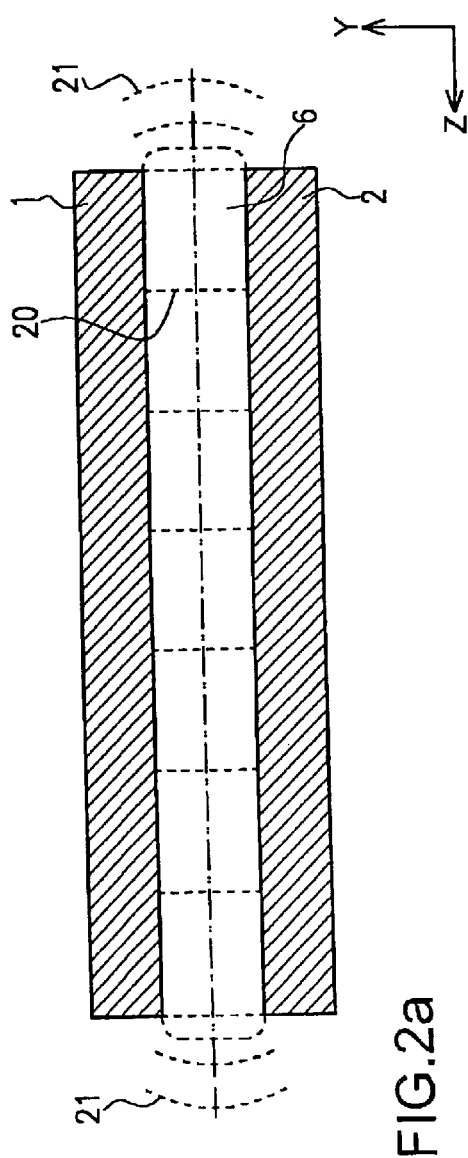
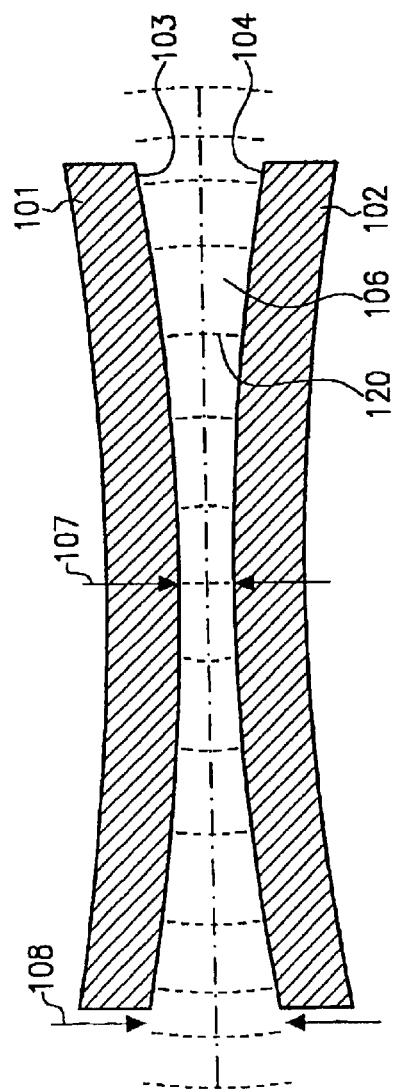
FIG.2a
FIG.2b

HIGH POWER SLAB TYPE GAS LASER

BACKGROUND OF THE INVENTION

The present invention relates to a gas laser comprising a pair of elongated electrodes arranged to define a discharge region between two opposing surfaces of said elongated electrodes, wherein the discharge region defines a longitudinal axis, a wide axis, and a narrow axis. The gas laser further comprises a lasing gas disposed in said discharge region, an excitation means for energizing the electrodes to excite the lasing gas, a first mirror arranged in front of a first end of the pair of elongated electrodes, wherein the first mirror has a first distance from the first end along the longitudinal axis. Furthermore, the gas laser comprises a second mirror arranged in front of a second end of the pair of elongated electrodes.

Gas lasers like the one indicated above are generally known in the art and are commonly referred to as gas slab lasers. Recently, this type of gas laser has steadily gained in importance due to fact that this laser device is compact yet capable of producing high output powers. This important feature resides in the fact that the discharge region containing the laser active gas is defined by a pair of opposing electrodes, commonly provided as rectangular planar plates, which, in turn, define a longitudinal axis substantially coinciding with the light propagation direction, a wide axis perpendicular to the longitudinal axis with a dimension of the discharge region in the wide axis of a few centimeters, and a narrow axis defined by the two opposing surfaces of the electrodes and typically having a dimension of a few millimeters. Thus, the transverse dimension in the wide axis is significantly larger than the dimension in the narrow axis. Contrary to laser devices having a rotational symmetrical arrangement along the longitudinal axis, the gas laser of the slab type offers a relatively large surface with respect to its discharge volume defined by the electrode plates so that heat dissipation is strongly improved, thus allowing a relatively high output power with a compact construction.

Many applications require a finely focusable laser beam and, thus, an output beam of high spectral mode purity is necessary. Therefore, a gas slab laser device operating in the fundamental transverse radiation mode, i.e., the radiation mode with a substantial Gaussian beam profile in the wide and narrow axes, is highly desirable. Accordingly, many gas lasers of the slab type are configured such that the distance of the electrodes defining the height of discharge region is selected to approximately 2 mm, at most, to establish a radiation exhibiting the fundamental waveguide mode in the narrow axis, whereas "external" resonator mirrors provide for the fundamental radiation mode in the wide axis, as is the case in a gas laser having a cylindrical configuration. Due to the confinement of the radiation field by the electrode surfaces light propagation along the narrow axis is commonly referred to as "waveguide" propagation, while light propagation along the wide axis, although controlled by the external resonator mirrors, is often referred to as "free space" propagation. Preferably, a negative branch unstable resonator formed by the external resonator mirrors in the wide axis is used, wherein one of the resonator mirrors is shorter than the other resonator mirror so that the laser beam broadened according to the magnification factor of the resonator can be coupled out of the resonator. To obtain the waveguide propagation with the fundamental transverse radiation mode with respect to the narrow axis, plane parallel electrode surfaces having an excellent reflectivity with a distance of approximately not more than 2 mm are required to achieve the desired output beam of high spectral mode purity. Due to the restriction with respect to the gap distance along the narrow axis to about 2 mm to generate a fundamental mode radiation, the volume of the laser active region, and thus the available output power, is also limited.

For example, U.S. Pat. No. 5,123,028 discloses a slab laser having planar highly reflective opposing electrode surfaces that are spaced apart 2 mm. The resonator is designed to form an unstable negative branch scheme, wherein the spherical resonator mirrors are positioned at a distance of approximately 20 mm away from the electrodes. The distance of the resonator mirrors is selected such that the curvature of the wave front of the radiation at the resonator mirrors matches the curvature of the resonator mirrors to thereby reduce radiation losses.

Theoretical as well as experimental results published in, for example, "Area Scaling Boots $CO_2$ Laser Performance", by D. R. Hall and A. J. Baker, in *Laser Focus World*, Vol. 25, No. 10, pages 77–80, 1989, "High Power $CO_2$ Waveguide Laser of the 1 kW Category", by R. Novak, H. Oppower, U. Schaefer at al., Proc. SPIE, 1276, *$CO_2$ Lasers and Applications*, II, pages 18–26, 1990, and "Planar Waveguide, 1 kW Cw Carbon Dioxide Laser Excited by a Single Transverse RF-Discharge", by H. D. Collay, H. J. Baker, D. R. Hall, *Applied Physics Letters*, Vol. 61, No. 2, pages 136–139, 1992, indicate that the main advantages of $CO_2$ lasers of the slab type are realized for a height of the discharge region of about 2 mm when the laser gas excitation frequency lies within the range of 81–125 MHz. It has been shown in these documents that the optimal design of a gas laser of the slab type requires the parameters of frequency and height to be selected in conformity with each other, whereby the specific values selected strongly affect the size of the laser head and the reliability and manufacturing costs of the laser device.

On the other hand, in "700 Watt Diffusion cooled, Large Area, 40.68 MHz Excited $CO_2$ Laser Employing Split Wave Hybrid Confocal Resonator", by P. Vitruk, J. Schemmer, S. Byron, Proc. SPIE, 3343, pages 677–686, 1989, it is shown that it is reasonable to excite a high power $CO_2$ laser of the slab type in the KW power range with an RF frequency of 40.68 MHz. Additionally to the general permission for this frequency for technological applications, the use of this RF frequency remarkably simplifies the RF generator and reduces the accuracy requirements regarding the laser head design. With a smaller RF frequency, and thus a larger RF wavelength, it is more easily practicable to provide a uniform excitation along the longitudinal length of the discharge region than for the above-identified frequency range of 81–125 MHz. This property additionally gains in importance as the length of the discharge region increases, as is the case in high power slab lasers having a length of the discharge region in the order of 1 m. In the above-identified documents, it is also shown that for a frequency of 40.68 MHz, the height of the discharge region should be selected with respect to output power optimization to about 4 mm or more. As previously explained, however, the arrangement of the discharge region having two plane-parallel electrodes defining a height of 4 mm and more does not allow to stabilize the fundamental transverse waveguide radiation mode without additionally excite the third radiation mode with an intensity comparable to the fundamental radiation mode.

However, as is shown in "The Characteristics and Stability of High Power Transverse Radio Frequency Discharges for Waveguide $CO_2$ Slab Laser Excitation", by P. Vitruck, D.

R. Hall, H. J. Baker, *Applied Physics Letters*, Vol. 25, pages 1767–1776, 1992, the employment of radio frequencies lower than approximately 35 MHz is disadvantageous in that the discharge transformation becomes increasingly unstable since, for high power applications, the large specific energy deposition leads to large discharge currents and a high average electron energy.

A further problem involved in conventional high power gas slab lasers of the slab type resides in the fact that for a high generation efficiency, the resonator mirrors are required to be closely positioned at the longitudinal ends of the electrodes to reduce the resonator losses owing to the coupling losses of the radiation propagating from the free space between the electrode and the resonator mirror back into the discharge region. Accordingly, a typical distance of the resonator mirrors from the electrodes is in the range from about 5–15 mm. The closely arranged resonator mirrors, however, are then exposed to plasma ions, and the interaction of the plasma ions with the mirror surfaces significantly reduces the lifetime of the mirrors while also leading to a gradual reduction of the laser output power.

SUMMARY OF THE INVENTION

In view of the above-mentioned problems and disadvantages of the prior art, it is therefore an object of the present invention to provide a gas laser of compact structure and high output power that is capable of outputting a laser beam of high spectral mode purity that may be finely focused for further applications.

The above-identified object is solved by a gas laser comprising a pair of elongated electrodes arranged to define a discharge region between two opposing surfaces of said elongated electrodes, wherein the discharge region defines a longitudinal axis, a wide axis and a narrow axis. The gas laser further includes a lasing gas disposed in said discharge region and an excitation means for energizing the electrodes to excite the lasing gas. A first mirror is arranged in front of a first end of the pair of elongated electrodes, wherein the first mirror is spaced apart from the first end along the longitudinal axis by a first distance, and a second mirror is arranged in front of a second end of the pair of elongated electrodes, wherein the first and the second mirrors define a resonator. Moreover, the two opposing surfaces have an electrode curvature, respectively, adapted to define a wave front curvature of a fundamental transverse radiation mode with respect to the narrow axis such that the wave front curvature substantially coincides with the first mirror curvature at the first distance.

According to the present invention, a gas laser of the slab type is provided, wherein the two opposing surfaces of the electrodes define a discharge region exhibiting a curvature with respect to the longitudinal axis, thereby creating a varying gap distance. The curvature of the discharge region is formed such that a wave front of the fundamental waveguide radiation mode established within the discharge region is substantially maintained when the wave front propagates into the free space between the discharge region and the first mirror. In particular, the wave front substantially coincides with the mirror curvature of the first mirror at the first distance at which the first mirror is positioned. In other words, according to the present invention matching the wave front of the fundamental radiation mode and the curvature of the first mirror is accomplished by appropriately bending the electrode surfaces. Thus, contrary to conventional slab lasers having plane parallel electrodes and generating a plane wave front within the discharge region which then significantly deforms while passing the free space region, the present invention allows a substantially undistorted propagation of the wave front established within the discharge region and thus significantly reduces the generation of higher order transverse radiation modes when the beam reflected by the first mirror is coupled into the discharge region.

In a further embodiment, the second mirror has a second mirror curvature and is spaced apart from the second end with respect to the longitudinal axis at a second distance and wherein said electrode curvature is adapted to define the wave front curvature to substantially coincide with the second mirror curvature at the second distance.

Accordingly, the wave front impinging on the first and second mirror substantially coincides with the curvatures of the first and second mirrors when reflected from the first and second mirrors so that the radiation is coupled into the discharge region with a minimum of losses and without further distortion of the wave front, thereby causing the fundamental transverse radiation mode to be substantially maintained. Moreover, contrary to prior art slab lasers having a discharge gap of 2 mm the present laser device exhibits a few times less radiation intensity at the resonator mirrors due to the higher discharge gap and a longer distance between the resonator mirrors and the electrodes Thus, lifetime of the mirrors as well as performance of the laser device is improved. Moreover, the electrode curvature of the electrodes at corresponding locations may individually be adapted to the properties of the first and second mirrors. That is, depending on the curvature of, for example, the second mirror, the electrode curvature at the side of the second mirror is accordingly selected that the wave front curvature matches the mirror curvature.

According to a further embodiment, a profile of the discharge region defined by the electrode curvatures of the opposing surfaces has a minimum gap distance along the narrow axis that is larger than approximately 2 mm.

In this embodiment, the minimum gap distance of the profile is larger than 2 mm, and accordingly an averaged gap distance of the discharged region is well above 2 mm so that the entire active volume of the inventive gas laser is significantly larger than that of comparable conventional slab lasers operating in the fundamental transverse radiation mode.

In a preferred embodiment, the minimum gap distance is in the range of approximately 2.5 mm–3.7 mm.

As previously explained, a correspondingly configured gas laser allows a large active volume due to the increased gap distance when compared to conventional slab lasers. Moreover, selecting the minimum gap distance in this range allows the application of the radio frequency for energizing the electrodes in the preferred range of about 35 to 45 MHz.

According to a further embodiment, a maximum gap distance with respect to the narrow axis of the profile is in the range of about 3.5 mm–6 mm.

This arrangement allows a large active volume, and thus a high output power, while still maintaining the fundamental transverse radiation mode.

In a further embodiment, the first and/or the second distance are in the range of 15–50 mm.

According to this embodiment, the interaction of gas ions with the first and second mirrors can be dramatically reduced compared to conventional gas slab lasers, thereby significantly improving the lifetime and the reliability of the gas laser.

In a further preferred embodiment, the first and/or the second distances are approximately 40 mm.

In a further embodiment, the first and second mirrors form an unstable negative branch resonator in the wide axis.

Using an unstable negative branch resonator significantly reduces the sensitivity to alignment errors of the first and second mirror due to the inherent optical characteristics of the unstable negative branch resonator.

In a further embodiment, the first and second mirrors are spherical or parabolic mirrors.

Fabricating spherical or parabolic mirrors is a well-established technique, and hence the combined availability and quality of corresponding mirror elements results in reduced manufacturing costs of the gas laser.

According to a further embodiment, the first and second distances are selected in conformity with the minimum gap distance and maximum gap distance, such that the resonator losses of the fundamental transverse radiation mode are less than 1%.

The first and second distances and the profile of the discharge region, and thus the minimum gap distance and the maximum gap distance, are interrelated parameters which are, according to this embodiment, selected by means of calculation algorithms established by the inventors to minimize the radiation losses of the fundamental transverse mode that occur when the radiation is coupled back into the discharge region after reflection at the first or second mirrors. Adjusting the radiation losses to a range of less than 1% efficiently stabilizes the fundamental transverse radiation mode to yield a stable output beam of high spectral purity. Moreover, as previously explained, the gap distances, and thus the electrode curvatures, at the first and the second ends of the electrodes may differ from each other depending on the mirror curvature of the first and second mirrors.

In a further embodiment, the first mirror has curvature $1/R_1$ and the second mirror has a curvature $1/R_2$, wherein $R_1$ and $R_2$ are selected such that the wave front curvature K of the fundamental transverse radiation mode with respect to the narrow axis is approximately given by:

$K \approx \frac{1}{2} \times (|1/R_1| + |1/R_2|)$, with $|1/R_2| < K < |1/R_1|$ $R_2 > R_1$ According to this embodiment, the curvature of the wave front of the fundamental transverse radiation mode is determined by the curvatures of the first and second mirrors so that the geometry of the electrodes may be selected in accordance with the curvatures of the first and second mirrors to set the curvature of the wave front within the above-defined range. This is accomplished by interrelating the various parameters, such as the radius of curvature of the mirrors, the profile of the height of the discharge region, the first and second distances, and the like, by means of simulation calculation.

In a preferred embodiment, the radius of the curvature $R_1$ and the radius of curvature $R_2$ are in the range of approximately 1 m–4 m.

Accordingly, the radii of curvature of the first and second mirrors are well suited for a device length in the order of 1 m as is preferably used for gas laser devices of the kilowatt power range.

According to a further embodiment, a magnification factor of the resonator formed by the first and second mirrors is in the range of approximately 1.1–2.0 .

An accordingly selected magnification factor is well-suited for a gas laser, especially for a $CO_2$ gas laser.

In a further embodiment, at least one of the two opposing surfaces of the electrodes includes plane surface portions.

Due to this arrangement, for example, one of the electrodes may be equipped with a surface curvature that is obtained by providing a plurality of plane surface portions that are inclined to each other at a defined angle to provide the curvature required. The provision of plane surface portions significantly facilitates manufacture of the corresponding electrodes.

In a further embodiment, one of the two electrodes is electrically connected to a reference potential, wherein the one electrode comprises a contiguous surface facing the other electrode.

The contiguous surface of the electrodes electrically connected to the reference potential, such as ground potential, allows the electrode to be manufactured as one piece and also provides an efficient cooling area.

According to a further embodiment, the gas laser further comprises a plurality of RF coupling portions to couple RF energy supplied from the excitation means into the discharge region.

The provision of a plurality of RF coupling portions allows to efficiently supply the RF power into the discharge region. Moreover, the RF power supplied to each of the RF coupling portions may individually be adjusted to obtain an optimum gain profile within the discharge region. In particular, the RF power may be selected in conformity with the gap distance of the electrodes at the longitudinal position of each of the RF coupling portions to optimize the gain profile for stabilizing the fundamental transverse radiation mode.

According to a further embodiment, at least two of the plane surface portions are electrically insulated from each other and serve as the plurality of RF coupling portions.

This arrangement allows a simple and thus effective manufacturing process for the electrode and also insures adequate application of the RF power by means of the plurality of plane surface portions.

In a preferred embodiment, the excitation means is adapted to operate in the range of about 35–45 MHz.

As previously explained in the introductory part of the application, an RF provided in this frequency range is very well suited for a high power gas laser device. Especially, a frequency of 40.68 MHz is preferable due to its permission for industrial applications.

In a further embodiment, the gas laser additionally comprises at least one pair of folding mirrors within the optical path defined by the first and second mirrors to form a zigzagging optical path.

Folding the optical path of the laser beam allows to effectively enlarge the active volume while still maintaining a simple electrode geometry. Moreover, folding the optical path leads to a multiplied length of the resulting resonator, depending on the number of pairs of folding mirrors provided, so that the number of longitudinal radiation modes is increased and thus operation stability of the laser is significantly improved.

In a further embodiment, the electrode curvature is formed such that the wave front curvature of the fundamental radiation mode substantially coincides with a mirror curvature of a respective one of the at least two folding mirrors at the location of the respective folding mirror.

Adapting the electrode curvature to the curvatures of the folding mirrors additionally reduces excitation of higher radiation modes. As is explained for the first and second mirrors, the at least two folding mirrors may also exhibit different focal lengths and, thus, the electrode, curvatures at the corresponding locations may differ from each other so as to optimally match the wave front curvature to the curvature of the respective folding mirror.

According to a preferred embodiment, the first and second mirrors form a confocal resonator having one focus within the resonator.

In a further embodiment, the first and second mirrors and the at least two folding mirrors define an odd number of foci within the resonator, wherein each pair of mirrors forming a branch of the resonator defines a common focus therebetween.

The folded confocal resonator arrangement ensures a large optical length of the slab laser while at the same time offering a minimum sensitivity to alignment errors of the mirror due to temperature variation during operation of the device.

Accordingly, a plurality of mirrors substantially identical in size, except for a mirror for coupling out the final laser beam, may be provided, thereby significantly contributing to cost reduction for the gas laser. The at least two folding mirrors are preferably spherical or parabolic mirrors.

In a further embodiment, folding mirrors disposed at the first end of the electrodes are spaced apart from the first end by a distance that is substantially equal to the first distance.

In a further embodiment, folding mirrors disposed at the second end of the electrodes are spaced apart from the second end by a distance that is substantially equal to the second distance.

According to this arrangement the geometrical configuration of the discharge region and, thus, of the electrodes, is simplified and allows a substantially rectangular arrangement. In order to maintain the confocal resonator scheme in each branch of the resonator the mirrors may need a different focal length. In many cases, providing the mirrors with a different curvature is preferred over an arrangement with a plurality of identical mirrors resulting in a more complex configuration of the discharge region when the confocal resonator scheme is maintained. It is to be noted, however, that both the simple arrangement, for example a rectangular structure, and the complex configuration using plural identical mirrors is within the scope of the present invention.

In a preferred embodiment, a length dimension of the pair of electrodes along the longitudinal axis is approximately 1600 mm, a width dimension in the wide axis is approximately 350 mm, a minimum gap distance is in the range of approximately 3.5–3.7 mm, and a maximum gap distance is in the range of approximately 4.5–5 mm, and the first and second distances are approximately 40 mm.

For a correspondingly designed gas laser, an output power of about 3 kW is obtained with an output beam exhibiting excellent divergence along the narrow axis and having a beam shape that is substantially equal to the Gaussian beam shape.

According to a further preferred embodiment, a specific RF power is in the range of 10–15 Watts per $cm^3$.

As will be shown in the detailed description, selecting a specific RF power supplied into the discharge region of 10–15 Watts per $cm^3$ ensures a gain progression in the discharge region that exhibits a substantially bell-shaped form so as to avoid or at least significantly reduce gain depletion of the fundamental radiation mode in the centre of the discharge region. Thus, the gain profile favors the fundamental transverse radiation mode over the higher order modes.

In a further embodiment, the excitation means is adapted to individually selectably supply the RF power to each of the coupling portions.

This embodiment allows the RF power to be optimally supplied to the discharge region, thereby taking into account the varying gap height of the discharge region due to the electrode curvature.

Further objects, advantages and embodiments will become apparent from the following detailed description and the appended claims.

BRIEF DESCRIPTION OF THE DRAWINGS

FIG. 2a, shows a schematic cross-sectional view of an electrode arrangement in accordance with a conventional slab laser device;

FIG. 2b shows a schematic cross-sectional view of the electrode arrangement in accordance with the present invention;

DETAILED DESCRIPTOIN OF THE PRESENT INVENTION

With reference to FIGS. 1–6 the basic concept of the present invention will be explained.

Figure 1A:
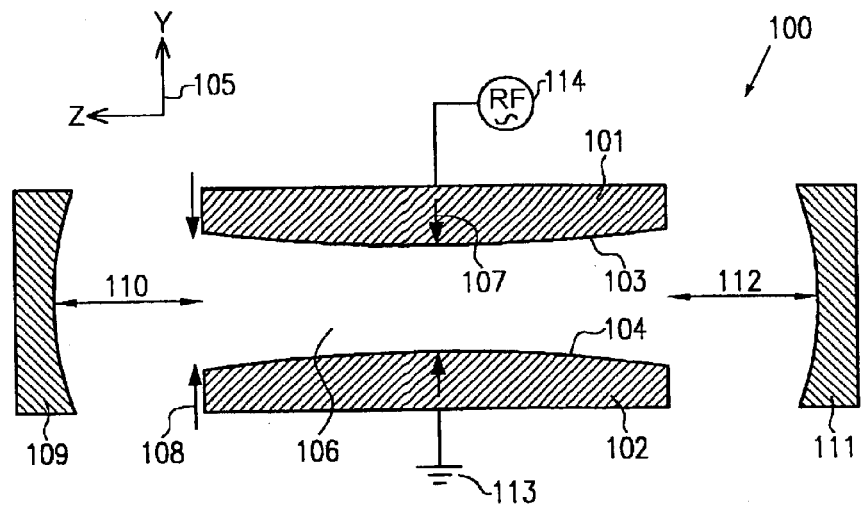
FIG. 1a and FIG. 1b are a schematic cross-sectional side view and a plan view, respectively, of one illustrative embodiment according to the present Invention.

In FIG. 1a a schematic cross-sectional side view of a first embodiment in accordance with the present invention is shown.

In FIG. 1, a gas laser device 100 comprises a pair of elongated electrodes 101 and 102 having surfaces 103 and 104, respectively, that are arranged in spaced relationship so as to face each other. The surfaces 103 and 104 exhibit a curvature in the longitudinal axis indicated by the Z axis of the coordinate system 105. The surfaces 103 and 104 define a discharge region 106 with a minimum gap distance 107 and a maximum gap distance 108. The discharge region 106 is filled with a laser active gas comprising, for instance, a mixture of $CO_2:N_2:He:Xe=1:1:6:0.4$. A pressure of the laser active gas may be maintained at a value of, for example, 50 Torrs with corresponding pump means that, for the sake of simplicity, are not shown in the Figure.

A first mirror 109 spaced apart with respect to the longitudinal axis from a first end of the pairs of electrodes 101 and 102 by a first distance 110 and a second mirror 111 spaced apart from a second end of the pair of electrodes 101, 102 by a second distance 112 define a laser resonator representing, in a preferred embodiment, an unstable negative branch resonator in a wide axis indicated by the X-direction of the coordinate system 105. The electrode 102 is electrically connected to a reference potential, such as ground potential 113, and the electrode 101 is connected to an excitation means 114, such as a radio frequency (RF) generator adapted to provide an RF power in a frequency range of 35–45 MHz. It should be noted that in the schematic illustration of FIGS. 1a and b, a housing, peripheral devices, as well as coupling portions for substantially uniformly providing the RF power to the electrode 101 are not shown.

Figure 1B:
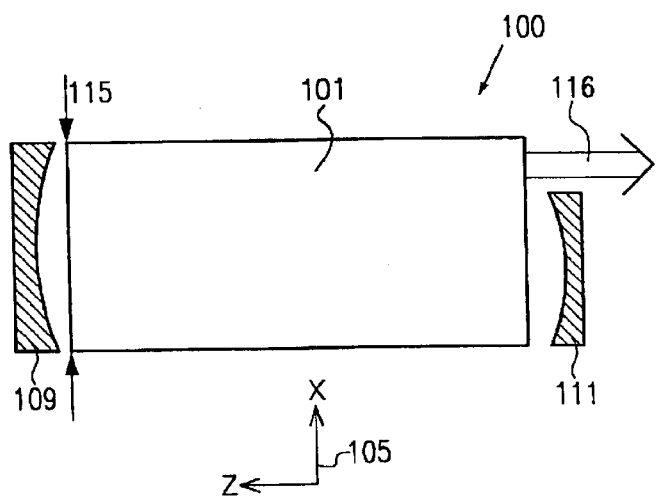

FIG. 1b schematically shows a plan view of the laser device 100 depicted in FIG. 1a. As is shown in FIG. 1b, the pair of electrodes 101 and 102 define a width of the laser device 100 in a wide axis indicated by the X-direction of the coordinate system 105. The width of the laser device 100 is typically several cm and may extend up to some tenth of cm when a folded resonator scheme is used, as will be described later. Moreover, as can be seen in FIG. 1b, the length of the second mirror 111 in the wide axis is shorter than the corresponding length of the first mirror 109 so that a laser beam 116 can be coupled out of the laser device 100.

In operation, the excitation means 114 supplies an RF power to the pair of electrodes 101, 102 and excites the laser gas contained in the discharge region 106. A radiation field builds up within the resonator defined by the first and second mirrors 109, 111 and leaves the laser device 100 at the second mirror 111 as the laser beam 116, the output power of which, as well as the characteristics with respect to divergence strongly depend on the resonator characteristics and the geometry of the electrodes 101 and 102. In order to facilitate the understanding of the present invention, the operation of a conventional gas laser exhibiting a slab geometry is explained with reference to FIG. 2a.

In FIG. 2a, a schematic cross-sectional view of a conventional slab geometry comprising two plane parallel electrodes 1 and 2 is depicted. The electrodes 1 and 2 include plane and parallel surfaces facing each other to define a discharge region 6 in which a wave front of the radiation within the discharge region 6 is schematically depicted by the dotted lines 20. As has been previously explained, stabilizing of the fundamental transverse waveguide mode requires a height a of the discharge region (in the narrow or Y-axis) of approximately 2 mm. A correspondingly configured electrode arrangement results in the substantially plane wave front indicated by the lines 20. At the ends of the electrodes 1 and 2, where the radiation leaves the discharge region 6 and propagates towards the resonator mirrors (not shown), the wave front will be deformed and will become substantially spherical (parabolic) when the distance along the longitudinal axis (Z axis) exceeds the order of magnitude of the height of the discharge region 6. In the case illustrated in FIG. 2a, the wave front of the radiation becomes substantially spherical as indicated by the dotted lines 21, at a distance of about more than 2 mm. Similarly, the wave front reflected from one of the resonator mirrors exhibits a substantially spherical shape depending on the curvature of the resonator mirror, and in coupling radiation into the discharge region 6, the wave front is distorted into a substantially plane wave front which will give rise to relatively large radiation losses during coupling of the radiation into the discharge region 6. If, on the other hand, the height of the discharge region 6 is increased, redirecting the radiation beam reflected by the resonator mirrors into the discharge region 6 will give rise to reflections at relatively large angles, thereby effectively creating higher order transverse radiation modes within the discharge region 6 and thus within the resonator of the laser device. As a consequence, up to 50% of the entire excitation energy is transferred to the higher transverse radiation modes if the height of the discharge region 6 is increased to about 4 mm.

In FIG. 2b, the arrangement of the electrodes 101 and 102 is depicted in greater detail. As can be seen from FIG. 2b, the surfaces 103 and 104 confining the discharge region 106 in the narrow axis (Y-axis) exhibit a curvature with the minimum gap distance 107 located in the centre of the electrodes 101, 102 along the longitudinal axis and the maximum gap distance 108 at the end of the electrodes. Consequently, the wave front of the fundamental transverse radiation mode shows a curvature, except for the central wave front at the minimum distance 107. According to the present invention, the curvature of the electrodes 101 and 102 is selected so as to substantially not distort the curvature of the wave fronts 120 when leaving the discharge region 106. Thus, the curvature of the wave front of the fundamental transverse radiation mode is maintained outside the discharge region 106 when the radiation propagates towards the resonator mirrors 109 and 111 (not shown in FIG. 2b). In order to substantially maintain the fundamental transverse radiation mode even after reflection from one of the first and second mirrors 109 and 111, it is preferable that the curvature of the wave front 120 substantially coincides with the curvature of the first and second mirrors 109 and 111. To this end, the first and second distances 110 and 112 (cf. FIG. 1a) and/or the curvatures of the electrodes 101 and 102 are selected such that the wave front curvature at the first and second distances substantially coincides with the curvature of the first and second mirrors 109 and 111.

It should be noted that, depending on the curvatures of the first and second mirrors 109 and 111, the first and second distances 110 and 112 may be set by, for instance, simulation calculations performed in advance, so that for a given curvature of the electrodes 101, 102 the mirror curvatures correspond to the curvature of the fundamental transverse radiation mode. Moreover, the device according to the present invention allows relatively large values for the first and second distances 110 and 112, for example 15 to 50 mm, thereby increasing reliability and lifetime of the mirrors.

Moreover, contrary to the conventional arrangement as shown in FIG. 2a, the present invention is not limited to a height of the discharge region 106 of about 2 mm, but instead the minimum gap distance 107 may vary up to 3.7 mm and the maximum gap distance 108 may correspondingly lie within a range up to 6 mm.

As is well known, the depth $\Delta$ of a spherical or parabolic mirror is proportional to the square of the mirror size h ($\Delta \propto h^2$). In the conventional slab geometry shown in FIG. 2a, the mirror size in the narrow axis is given by the height of the discharge region 6 or, in geometrical approximation, by the size of the light beam on the mirror surface, and thus the phase retardation equals 2 times the depth $\Delta$ of the mirror and also shows a square dependence (phase retardation $\propto h^2$) on the height of the discharge region. In the conventional laser having a small height of the discharge region (approximately 2 mm), the curvature of the wave front 21 is relatively strongly bent at the transition to the free space, and thus the distortion caused by the curvatures of the resonator mirrors may be compensated, at least partially, by properly selecting the distance from the resonator mirrors to the electrodes. For a larger height of the discharge region, e.g. for 3–5 mm, however, this method is no longer suitable since the curvature of the fundamental transverse radiation mode is only slightly changing in free space, while the curvature of the resonator mirrors is relatively large, e.g. the focus length of the mirrors ranges from about 0.5–1.0 m for a confocal resonator scheme. As a consequence, for a height of the discharge region exceeding 2 mm considerable radiation losses of the fundamental mode will occur at the transition from free space to the discharge region, i.e., at the butt-ends of the electrodes 101, 102. As previously explained, the square dependence of the phase retardation from the height of the discharge region will increase the losses of the fundamental radiation mode by a factor of 4 by transferring energy from the fundamental radiation mode to the higher order modes when the height of the discharge region is varied from 2–4 mm.

Figure 3:
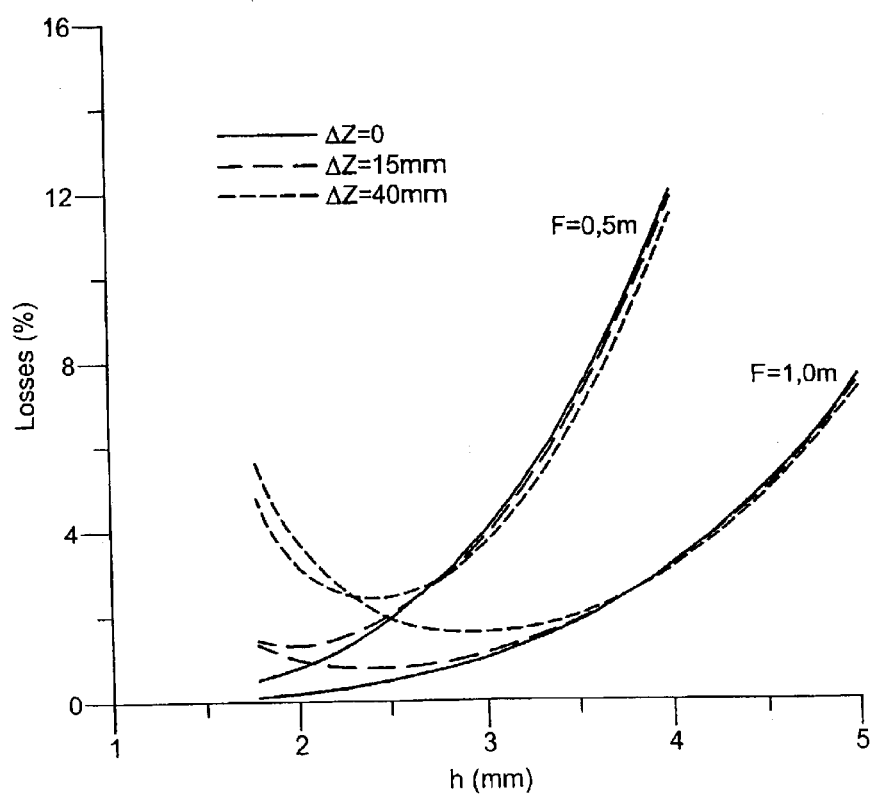
FIG. 3 shows a graph depicting calculation results for radiation losses of the fundamental mode in a slab laser geometry with respect to a distance of the electrodes, wherein the distance $\Delta Z$ of the resonator mirror from the electrode in the longitudinal axis is used as a parameter.

FIG. 3 shows the results of calculations performed by the inventors, wherein the radiation losses are calculated with respect to the height of the discharge region for three different distances $\Delta Z$ of the resonator mirrors from the electrode arrangement shown in FIG. 2a and for two different focus lengths of the resonator mirrors. As is evident from FIG. 3, for a focus length of 0.5 m, the radiation losses of the fundamental mode dramatically increase at about 2.5 mm for distances $\Delta Z$ of 0 mm (solid line), 15 mm (short-dashed line) and 40 mm (dashed line).

The increase of radiation losses of the fundamental radiation mode for a height larger than about 2.5 mm is mainly caused by transferring energy from the fundamental mode to higher order modes. The energy of the higher order modes is determined by the distortion of the wave front of the fundamental radiation mode when interacting with the surface of the mirrors. This distortion is caused by the phase retardation, which, in turn, is proportional to the square of the gap height.

The increase of losses of the fundamental radiation mode for a height of less than about 2.5 mm is primarily caused by coupling losses when the radiation of the fundamental mode re-enters the discharge region and partially hits the electrodes.

For a focus length of 1.0 m, the radiation losses of the fundamental mode are significantly smaller, however at a height of the discharge region of 4 mm, radiation losses of about 3.5% will occur and these radiation losses cannot be compensated by varying the distance $\Delta Z$ within the range of 0 mm to 40 mm.

As a consequence of the above results, in the present invention the surfaces 103 and 104 of the electrodes 101 and 102 are formed such that preferably the curvature of the fundamental transverse radiation mode K is approximately given by:

$$K \cong \tfrac{1}{2} \times (|1/R_1| + |1/R_2|),$$

wherein $R_1$ and $R_2$ are the minimum and maximum radii, respectively, of the resonator mirrors. In other words, according to the inventors' finding, the shape of the surfaces 103 and 104, i.e. the profile of the discharge region 106 along the longitudinal axis, is formed in accordance with corresponding calculations such that the resulting curvature of the wave front of the fundamental transverse radiation mode is within the above-specified range. It should be noted that the previously used wording "the curvature of the wave front substantially coincides with curvatures of the mirrors" intends to include any wave front curvature meeting the above requirements.

The deviation of the curvature K from the curvature of an arbitrary one of the mirrors used to form a resonator, i.e. the mirrors 109 or 111 in FIG. 2a, is then given by:

$$dK_i = K - |1/R_i|,$$

wherein $R_i$ is the radius of curvature of the i-the mirror and is preferably in the range of 1.0–2.0 m. Moreover, in the embodiment described herein, the magnification factor of the resonator formed by, for example, the mirrors 109 and 111 in FIG. 2a is in the range of 1.15 and 2.0. Thus, $dK_i \cong 0.1$ for a magnification factor M=1.4, and $dK_i \cong 0.05$ for M=1.2. Under these conditions, the radiation losses of the fundamental transverse radiation mode can be determined by means of calculating the losses of the fundamental transverse radiation mode of a plane waveguide, i.e. of a conventional electrode arrangement as shown in FIG. 2a, with resonator mirrors having a radius of curvature of $1/dK_i$. The validity of such a calculation follows from the fact that the quasi-optic equations are invariant with respect to lens transformation as is shown in, for example, A. E. Sigman. E. A. Sziklas, "Mode Calculations in Unstable Resonators with Flowing Saturable Gain. Fast Fourier Transform Method", *Applied Optics*, Vol. 14, No. 8, pages 1874–1899, Aug. 1975. It follows that $1/dK_i \cong 10$ m, for a magnification factor of M=1.4; and
$1/dK_i \cong 20$ m for a magnification factor of M=1.2.

Figure 4:
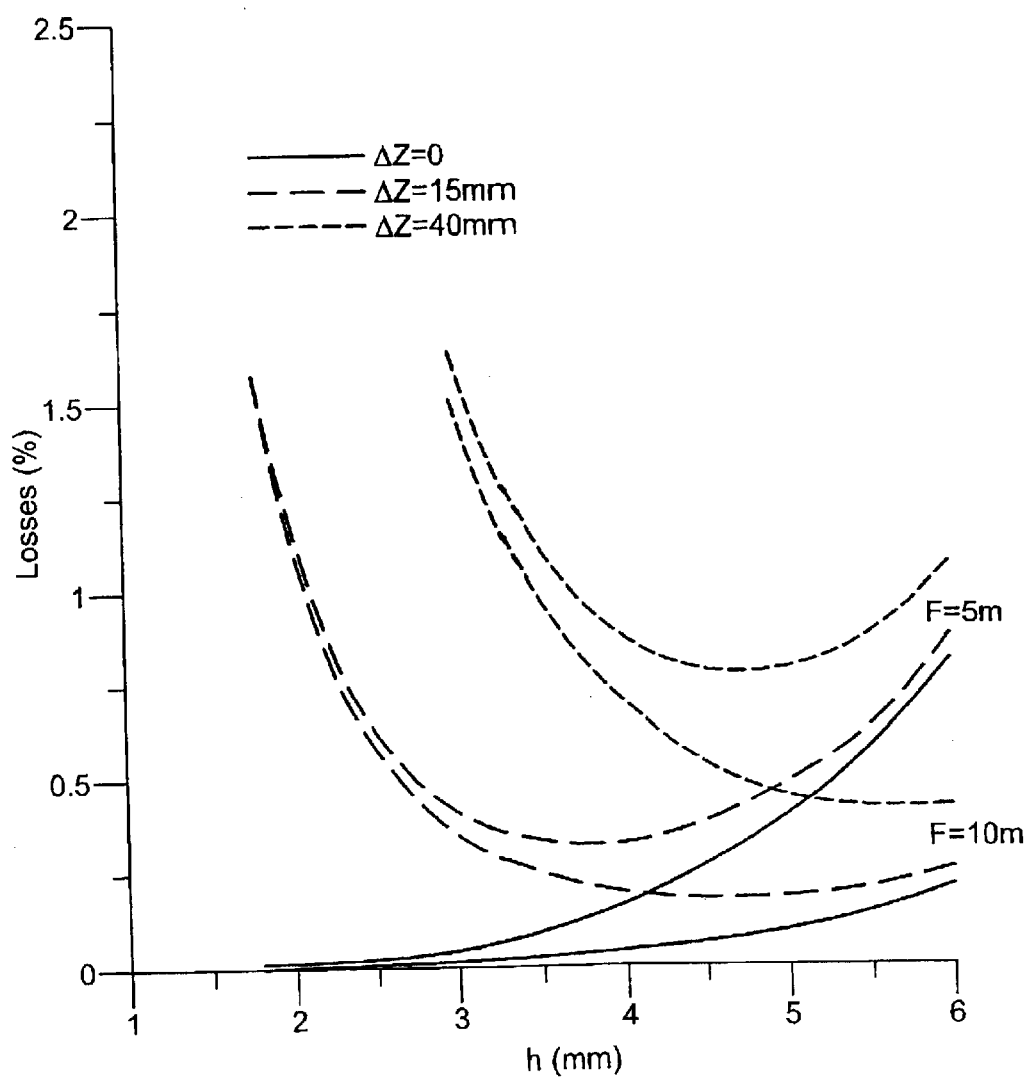
FIG. 4 shows a graph depicting the radiation losses of the fundamental mode within the resonator with respect to a distance of the electrodes wherein, contrary to the graph of FIG. 3, the focus length of the resonator mirror is significantly increased.

FIG. 4 shows the results of a corresponding calculation of the radiation losses of the fundamental mode with respect to the gap distance, i.e., the distance of plane-parallel electrodes of a conventional slab laser (cf. FIG. 2a), for two different focus lengths of 5 m and 10 m corresponding to a radius $R_1$ of 10 m and $R_2$ of 20 m, respectively, which represents the deviation $dK_i$ according to the present invention. Similarly as in FIG. 3 the losses were calculated for three different distances $\Delta Z$. As is evident from FIG. 4, for a focus length of 5 m and a $\Delta Z=0$, the radiation losses of the fundamental mode for a gap distance of 4 mm are less than 0.25% and the radiation losses for a distance $\Delta Z=40$ mm exhibit a minimum at a gap distance of about 4.5 mm. For the focus length of 10 m, the radiation losses of the fundamental mode between 4 mm and 5 mm of gap distance are between 0.7 and 0.5%. For $\Delta Z=0$ mm, the losses at a gap distance of 4 mm are in the order of 0.1%. As it has previously been explained, however, a small distance of the mirror from the ends of the electrodes is, with respect to lifetime and reliability of the laser device, not desirable and therefore, a distance $\Delta Z$ of more than 15 mm is used in the preferred embodiments for the first and second distances 110 and 112.

Comparing the results of FIGS. 3 and 4, the radiation losses of the fundamental mode in accordance with the present invention are in the range of 0.5–0.7% for a gap distance for about 4.5 mm. This value is about 10 times less than in the conventional electrode arrangement as shown in FIG. 2a. Furthermore, it is important to note that the form of the fundamental transverse radiation mode is conserved so that substantially no additional reflections upon entering the discharge region will occur and higher order transverse radiation modes are not excited or at least strongly suppressed. As a further con-sequence of the profile of the discharge region along the longitudinal axis defined by the surfaces 103 and 104, the light beam of the fundamental transverse radiation mode propagates within the discharge region 106 at a substantially sliding angle so that the radiation losses in the waveguide direction, i.e. the narrow axis, are also minimized.

A further criterion in stabilizing the fundamental transverse radiation mode within the discharge region 106 is the appropriate application of the RF excitation power to the discharge region. According to a further embodiment of the present invention, the application of the RF excitation power is carried out such that the small signal gain exhibits a progression along the narrow axis that is appropriate to stabilize the fundamental transverse radiation mode, while at the same time avoiding overheating of the central portion of the discharge region. In studying the mutual relationship of small signal gain, temperature, excitation power supplied to the discharge region and height of the discharge region, a calculation algorithm, described in Laser Optics 2000: High-Power Gas Lasers, Proc. SPIE, Vol. 4351, paper 4531–13, is used for determining the gain profile and the temperature profile within the discharge region with respect to the height of the discharge region and the power supplied thereto.

Figure 5A:
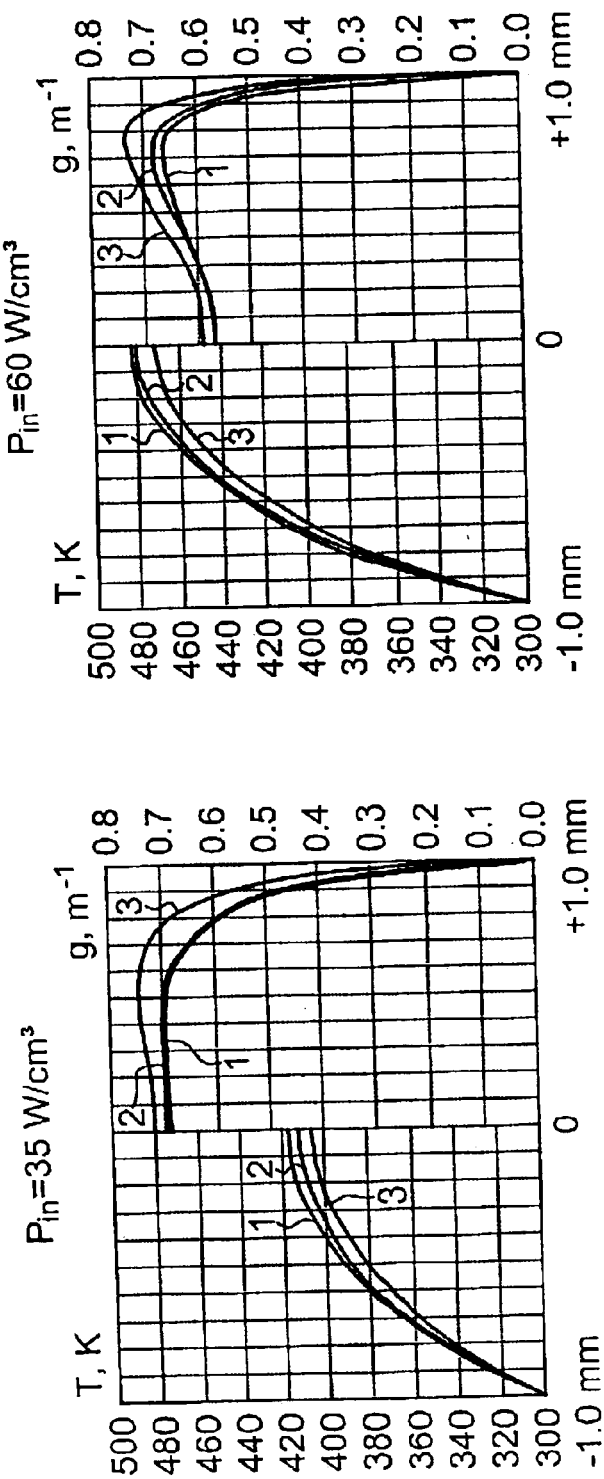
FIGS. 5a-5c are graphs depicting the calculation results of temperature and small signal gain in the discharge region of a slab laser with respect to the height of the discharge region for different excitation energies supplied to the discharge region.
Figure 5B:
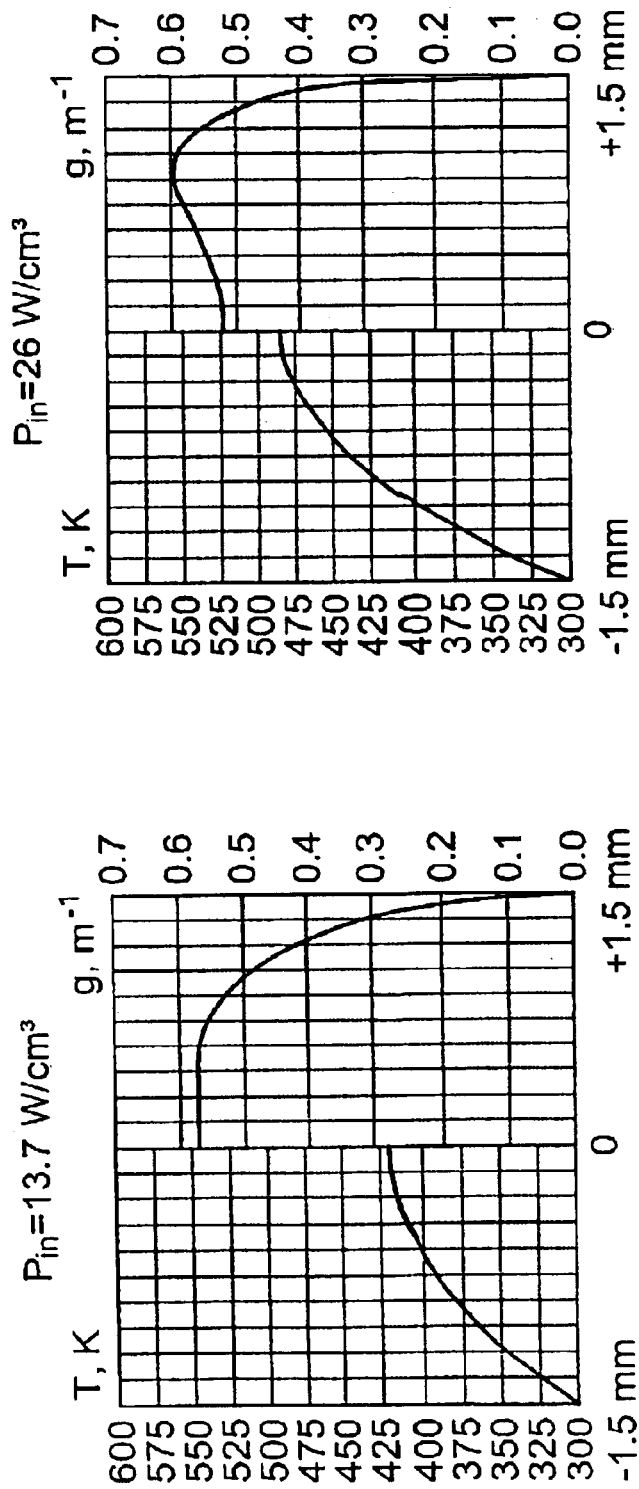
Figure 5C:
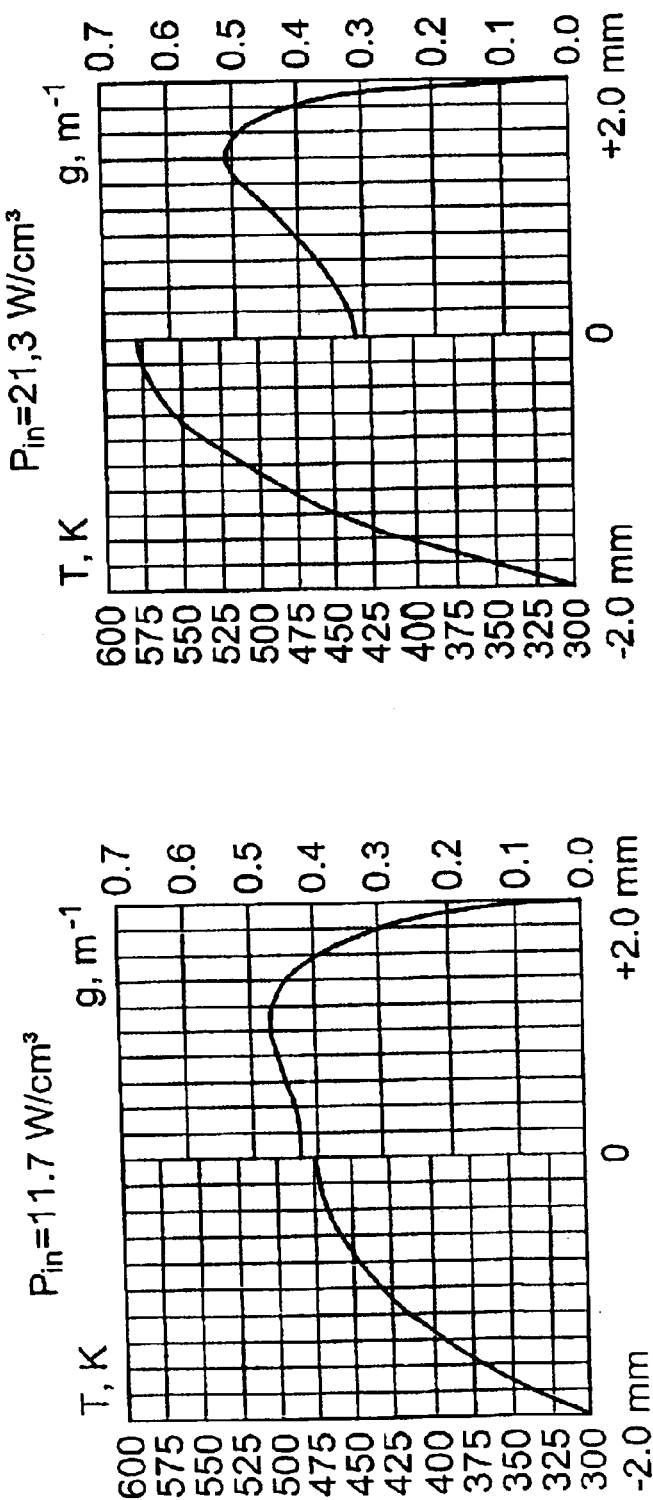

In FIGS. 5a–5c, respective results of these calculations are depicted. In FIG. 5a, the small signal gain g and the temperature T of the discharge region for a height of 2 mm are illustrated. In the left graph, an RF excitation power of 35 Watts/cm$^3$ for a frequency of 41 MHz (Curve 1), 81 MHz (Curve 2) and 125 MHz (Curve 3) is supplied to the lasing gas within the discharge region that is composed of a mixture of $CO_2:N_2:He:Xe=1:1:6:0.4$ with a gas pressure of 50 Torrs and a rate of disassociation of the carbon dioxide molecules of about 60%.

In the right graph, the same parameters are applied except for an RF excitation power of 60 Watts/cm$^3$. Apparently, increasing the RF power leads to a significant decrease in the small signal gain at the central portion of the discharge region, whereas the temperature remarkably rises. Thus, increasing the RF power leads to an enhanced at positions of a high field intensity of the third order transverse radiation mode.

FIG. 5b shows similar calculations for a height of 3 mm and for RF excitation powers of 13.7 Watts/cm$^3$ (left graph) and for 26 Watts/cm$^3$ (right graph), whereby the frequency of the RF excitation power is 41 MHz. As in the previous case, increasing the RF excitation power leads to a significant decrease in the small signal gain and to a strong increase of the temperature of the central portion of the discharge gap, thereby favoring the creation of the third and higher transverse radiation modes.

In FIG. 5c, corresponding calculations for a height of 4 mm and a frequency of 41 MHz are shown. It is evident from FIG. 5c that for an RF excitation power of 21.3 Watts/cm$^3$ a large portion of the RF excitation energy is provided at a location of the discharge region, where the third transverse radiation mode has its maximum. As a consequence, according to the present invention the amount of RF excitation power supplied is appropriately set with respect to the height of the discharge region, thus significantly contributing to the stabilization of the fundamental transverse radiation mode.

Accordingly, in one illustrative embodiment, the shape of the surfaces 103 and 104 in the longitudinal axis was selected to be near parabolic, wherein the gap distance 107 at the central portion of the discharge region 106 is in the range of 3.5–3.7 mm. The maximum gap distance 108 at the ends of the electrodes 101 and 102 is in the range of 4.5–5 mm. The frequency of the RF excitation energy is selected to 40.68 MHz with a power of 11–15 W/cm$^3$. This insures a bell-like gain profile along the narrow axis that supports the stabilization of the fundamental transverse mode.

Figure 6A:
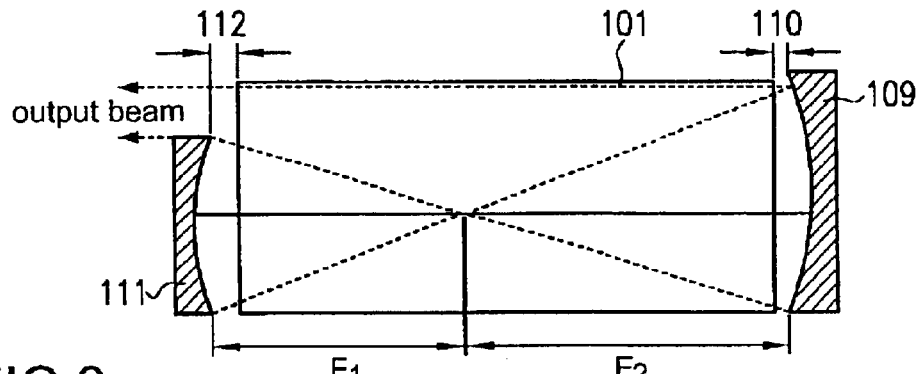
FIGS. 6a and 6b are schematic plan views of a single pass resonator scheme and of a folded or zigzagged resonator scheme, respectively.

In FIG. 6a a schematic top view of a laser arrangement in accordance with the above illustrative embodiments is depicted. The length of the electrode 101 in the longitudinal axis is about 1 m and the first and second mirrors 109 and 111 define one focus within a resonator defined by these mirrors, as is indicated by the focus length $F_1$ and $F_2$. The focal length may be selected so that $F_2=MF_1$, wherein M is the magnification of the resonator. The final laser beam is coupled out at the second mirror 111 and comprises an excellent divergence along the narrow axis with an output beam shape very close to the Gaussian beam shape. It should be noted that the embodiment shown in FIG. 6a is preferably configured by adopting the above-derived parameter ranges, such as a minimum gap distance of 3–4 mm, a maximum gap distance of 3.5–5 mm, first and second distances $\Delta Z$ of 15–50 mm, radii of curvature of the mirrors of 1–2 m. In particular, the gap distances at the first end second ends of the electrodes may be selected in accordance with the respective curvature of the first and second mirrors 109 and 111. In this way, the wave front curvature at each mirror 109 and 111 can precisely be matched to the mirror curvature. In the above example, the first mirror 109 comprises a larger radius of curvature and thus the corresponding "maximum" gap distance at this end of the electrodes is smaller than the "maximum" gap distance at the other end of the electrodes.

Figure 6B:
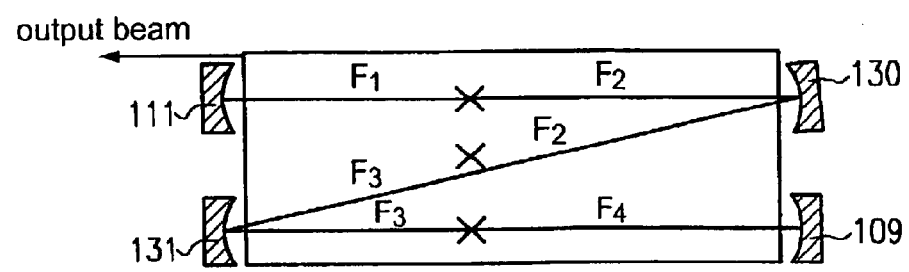

FIG. 6b schematically shows a modification of the above-illustrated embodiments, in which additionally a pair of folding mirrors 130 and 131 are provided within the optical path defined by the first and second mirrors 109 and 111 having focal lengths $F_1$ and $F_4$, respectively. The folding mirrors 130 and 131 are spherical or parabolic mirrors having focus lengths $F_2$ and $F_3$ as indicated in FIG. 6b to define three foci within the resonator defined by the mirrors 109, 111, 130 and 131. Providing a folded optical path allows to effectively increase the optical length and thus the number of longitudinal modes of the laser device. Moreover, the active volume and therefore the output laser power of the laser device can be increased without increasing the absolute length of the laser device. In this preferred embodiment the mirrors 111, 130 and 131 are formed to have different focal length such that the distances of the mirrors 111, 131 from the one end of the electrodes and the distances of the mirrors 109, 130 from the other end of the electrodes are substantially identical, respectively. The resulting configuration of the discharge region and, thus, of the electrodes is then a rectangular configuration. In another embodiment (not shown), the focal lengths of the mirrors 130, 131 and 109 may be selected substantially equally so that, in order to maintain the confocal arrangement of the resonator, the distance of the mirrors 109 and 131 is larger than the distance of the mirrors 111 and 130. The resulting configuration of the discharge region is then adapted to account for the longer resonator arm of the mirrors 109 and 131. In each of the embodiments the curvatures of the electrodes may be matched to the corresponding curvature of the mirror disposed at that end of the electrodes. In the embodiment of FIG. 6b, for example, this may require four different electrode curvatures at the four different corners of the electrodes.

Figure 6C:
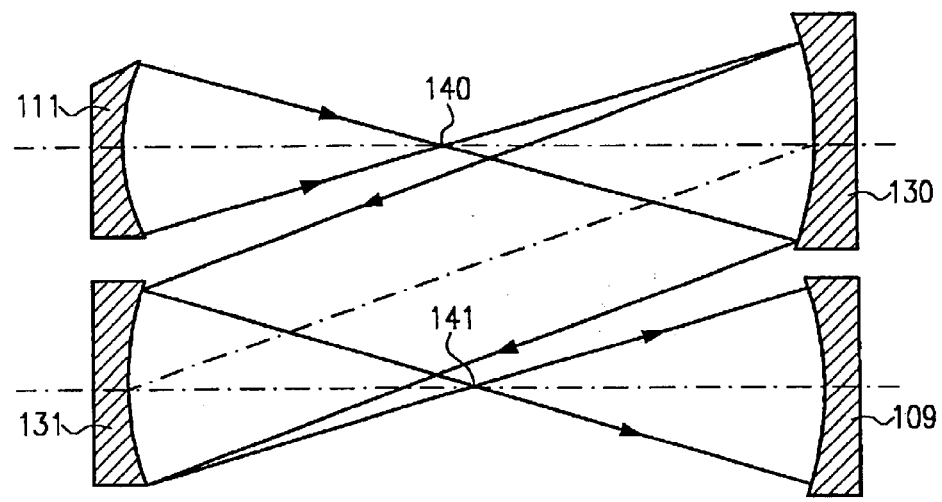
FIGS. 6c and 6d schematically show the beam propagation of the resonator scheme shown in FIG. 6b.
Figure 6D:
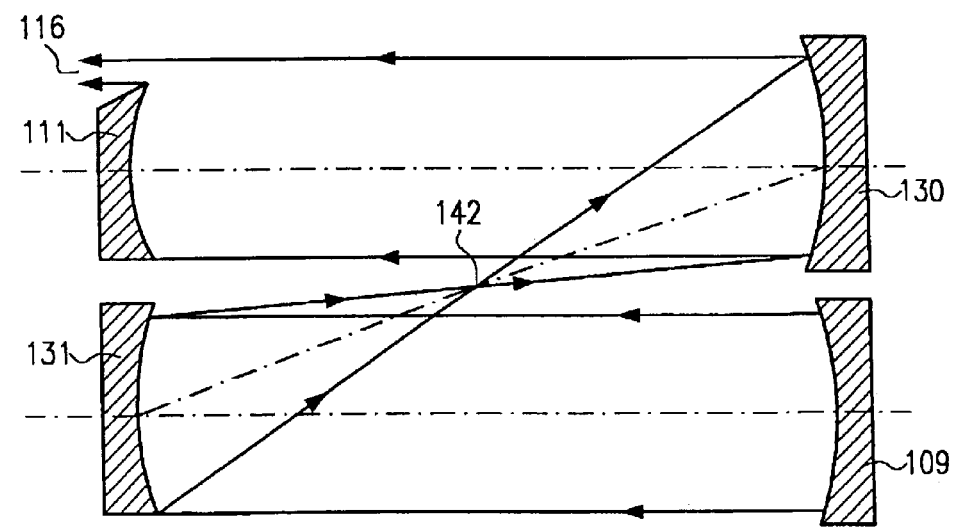

In FIGS. 6c and 6d, the beam propagation in the resonator defined by the mirrors 109, 111, 130, 131 is shown in more detail. As can be seen from FIG. 6c, the pair of mirrors 111 and 130 define a first focus 140, the pairs of mirrors 131 and 109 define a second focus 141 and the pair of folding mirrors 130 and 131 define a third focus 142. It should be noted that the mirrors 109, 130 and 131 may be selected to exhibit substantially the same length in the wide dimension, wherein, for example, the folding mirrors 130 and 131 are inclined at a slight angle to provide for the folding of the optical axis. In the example of FIGS. 6c and 6d, the foci 140, 141 and 142 are positioned at different locations with respect to the longitudinal axis due to the different focal lengths of the mirrors 109, 111, 130 and 131. A representative example for dimensioning the laser of this embodiment may be as follows.

The lengths $D_1$, $D_2$, $D_3$, $D_4$ and the focal lengths $F_1$, $F_2$, $F_3$, $F_4$ of the mirrors 111, 130, 131 and 109 in the wide axis may be selected so that $D_2=D_3=D_4=MD_1$, wherein M is the magnification of the resonator. The focal lengths of the mirrors 111, 130 may be selected to $F_1+F_2=L$, $F_2=MF_1$, wherein L is the distance between two mirrors, that is, the length of the electrodes including the first and second distances 112 and 110 (cf. FIG. 6a). The focal length of mirror 131 may be set $F3 \approx L/2$. The focal length $F_4$ of the mirror 109 is then determined such that the resonator magnification yields the desired value M and the output beam is substantially parallel to the optical path of the mirrors 111 and 130. $F_4$ may be obtained by the following expression:

$$F_4 = \frac{L^2 \cdot (2M+1) - L \cdot L_{23} \cdot (M+1)}{L(7M+3) - L_{23} \cdot 4(M+1)},$$

where $L_{23}$ is the distance of the optical centers of the mirrors 130 and 131.

In a further embodiment (not shown) a plurality of pairs of folding mirrors may be provided so as to create a plurality of branches to produce a zigzagging laser beam that may finally be coupled out at one of the individual mirrors that is shorter than the remaining mirrors. In such a configuration, two optically adjacent mirrors must not necessarily be geometrically adjacent. That is, a mirror located at one end of the electrodes may form a focus with a mirror located at the other end of the electrodes that is spaced apart along the wide axis from the first mirror, wherein one or more additional mirrors are disposed between the corresponding pair of mirrors. As previously explained, in order to minimize radiation losses of the fundamental mode the curvatures of the plural folding mirrors may be precisely adapted to the wave front curvature of the fundamental radiation mode by individually forming the electrode curvature for a respective mirror in conformity with the respective mirror curvature.

Moreover, the present invention is not limited to a single discharge region in the wide axis. Instead, two or more discharge regions may be provided along the wide axis by respectively arranged electrodes, or two or more discharge regions may be stacked along the narrow axis in the form of an electrode stack, wherein in both cases the individual discharge regions may be optically coupled by folding means such as prisms, mirrors and the like. Furthermore, a multi-beam device may be embodied by providing two or more non-coupled discharge regions, each of which may include a single-pass resonator or a zigzag resonator.

Figure 7:
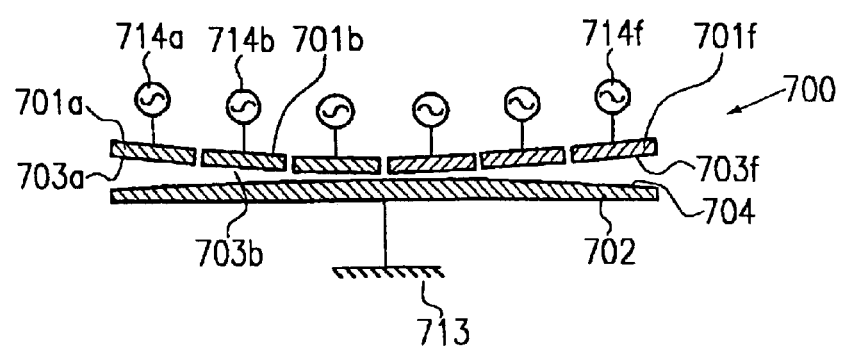
FIG. 7 schematically shows a cross-sectional side view of an multi-electrode arrangement in accordance with a further preferred embodiment of the present invention.

FIG. 7 schematically depicts a further embodiment in accordance with the present invention. In FIG. 7, a laser device 700 comprises a first electrode including a plurality of electrode elements 701a–701f and a second electrode 702. The electrode elements 701a–701f have respective surface portions 703a–703f which define, in combination with a surface 704 of the electrode 702, a discharge region 706. The electrode 702 is electrically connected to a reference potential 713, whereas each of the electrode elements 701a–701f is connected with a corresponding RF excitation means 714a–714f. The surface portions 703a–703f may be provided as plane surface portions which are inclined with respect to the longitudinal axis to define a curvature that meets the requirements as previously explained with reference to FIG. 2b. In particular, when the mirror curvatures of the mirrors forming the resonator (not shown) are different, the distance and/or the angle of inclination of the respective electrode elements 701a–f may be selected to form an optimal electrode curvature for the respective mirror. For example, the electrode elements 701a, b may have a different angle of inclination and/or distance to the electrode 702 than their counterpart electrode elements 701f, e. Moreover, the electrode 702 may also be formed to account for differently curved mirrors. The electrode 702 or at least the surface 704 may preferably be made as an integral part, but may also be fabricated by two or more individual electrode elements similar to the electrode elements 701a–701f.

In operation, each respective RF excitation means 714a–714f supplies an RF excitation energy to the corresponding electrode portions 701a–701f. In this way, the RF power supplied to each of the electrode elements may be optimized with respect to the corresponding height of the discharge region 706 at the positions of the respective electrode portions 701a–701f in conformity with calculations explained with reference to FIG. 5.

Accordingly, this embodiment allows to conveniently provide an optimum RF energy to the different portions of the discharge region 706 to obtain an optimum gain profile in the narrow as well as in the longitudinal axis for stabilizing the fundamental transverse radiation mode. Although the number of electrode portions 701a–701f is 6 in the embodiment shown in FIG. 7, any number of electrode portions 701a–701f may be used. Moreover, preferably the surface portions 703a–703f are flat areas to facilitate fabrication of the electrode arrangement, the surface portions 703a–703f may comprise a curvature that in its entirety forms the profile in the longitudinal axis. Regarding the design of the resonator, the same arguments as given above apply in this embodiment.

According to one illustrative embodiment, the length of the electrodes 702 and 701a–701f is approximately 1600 mm, whereas the width of the electrodes (the wide axis) is approximately 350 mm. The distance of the mirrors (not shown in FIG. 7) from the electrodes is approximately 40 mm and the magnification factor of the resonator is in the range of M=1.2–1.4. The RF excitation energy supplied to the individual electrode elements 701a–701f is in the range of 10–15 Watts/cm$^3$ to provide the optimum gain distribution in the narrow axis. That is, preferably for each of the electrode portions 701a–701f the exact RF power may be set according to the average distance of this electrode portion from the other electrode 702. It is, however, possible top provide substantially the same RF power to each of the electrode portions 701a–701f. With this embodiment, an output power of about 3 kW is obtained. The output beam divergence is close to the diffraction limit.

It should be noted that the embodiments described with reference to FIG. 7 may be provided with any of the resonator schemes as described in the aforementioned embodiments. Moreover, the embodiments of FIG. 7 may also be modified to represent a multi-beam configuration and/or a configuration having a plurality of discharge regions, as previously described.

What is claimed is:
1. A gas laser comprising:
a pair of elongated electrodes, arranged to define a discharge region between two opposing surfaces of said elongated electrodes, the discharge region having a longitudinal axis, a wide axis and a narrow axis,
a lasing gas disposed in said discharge region,
an excitation assembly configured to energize the electrodes to excite the lasing gas, a first mirror having a first mirror curvature, the first mirror being spaced from a first end of the pair of elongated electrodes with respect to the longitudinal axis by a first distance, and a second mirror arranged spaced from a second end of the pair of elongated electrodes, the first and the second mirrors defining a resonator, wherein said two opposing surfaces have an electrode curvature, respectively, configured to define a wave front curvature, for a wave propagating towards the first mirror, of a fundamental transverse radiation mode with respect to the narrow axis, and said wave front curvature, for the wave propagating towards the first mirror, substantially coinciding with the first mirror curvature at the first distance.

2. The gas laser of claim 1, wherein said second mirror has a second mirror curvature and is spaced from the second end with respect to the longitudinal axis by a second distance and wherein said electrode curvature is configured to define said wave front curvature to substantially coincide with the second mirror curvature at the second distance.

3. The gas laser of claim 1, wherein a profile of the discharge region defined by the electrode curvatures of said opposing surfaces has a minimum gap distance that is more than approximately 2 mm.

4. The gas laser of claim 3, wherein said minimum gap distance is in the range of about 2.5 mm–3.7 mm.

5. The gas laser of claim 3, wherein a maximum gap distance of said profile is in the range of approximately 3.5–6 mm.

6. The gas laser of claim 1, wherein at least one of the first distance and the second distance is in the range of approximately 15–50 mm.

7. The gas laser of claim 1, wherein at least one of the first distance and the second distance is approximately 40 mm.

8. The gas laser of claim 1, wherein the first and second mirrors form an unstable negative branch resonator in the wide axis.

9. The gas laser of claim 1, wherein the first and second mirrors comprise at least one of a spherical and a parabolic mirror.

10. The gas laser of claim 3, wherein the first and second distances are selected in association with the minimum gap distance and the maximum gap distance so that resonator losses of the fundamental transverse radiation mode are less than approximately 1%.

11. The gas laser of claim 2, wherein the first mirror has a curvature $1/R_1$ and the second mirror has a curvature $1/R_2$, and whereby $R_1$ and $R_2$ are selected such that said wave front curvature, K, of the fundamental transverse radiation mode with respect to the narrow axis is approximately given by:

$$K \approx \tfrac{1}{2} \times (|1/R_1|+|1/R_2|).$$

12. The gas laser of claim 11, wherein $R_1$ and $R_2$ are in the range of approximately 1 m to 4 m.

13. The gas laser of claim 1, wherein a magnification factor of said resonator is in the range of approximately 1.1 to 2.0.

14. The gas laser of claim 1, wherein at least one of said two opposing surfaces of the pair of elongated electrodes includes a plane surface portion.

15. The gas laser of claim 1, wherein one of the two electrodes is electrically connected to a reference potential and said one of the two electrodes comprises a contiguous surface facing the other one of the two electrodes.

16. The gas laser of claim 1, further comprising a plurality of radio frequency couplers that couple radio frequency energy supplied from the excitation assembly into the discharge region.

17. The gas laser of claim 16, wherein at least two plane surface portions, provided on said opposing surfaces of the pair of elongated electrodes are electrically insulated from each other and serve as the plurality of radio frequency couplers.

18. The gas laser of claim 1, wherein the excitation assembly is configured to operate in a range of about 35–45 MHz.

19. The gas laser of claim 1, further comprising at least one pair of folding mirrors positioned within an optical path defined by the first and second mirrors to form a zigzagging optical path in the plane defined by the longitudinal axis and the wide axis.

20. The gas laser of claim 19, wherein said electrode curvature is formed such that the wave front curvature of the fundamental radiation mode substantially coincides with a mirror curvature of a respective one of said at least one pair of folding mirrors at the location of the respective folding mirror.

21. The gas laser of claim 1, wherein the first and second mirrors form a confocal resonator having a focus within the resonator.

22. The gas laser of claim 19, wherein the first and second mirrors and the at least one pair of folding mirrors define an odd number of foci within said resonator, and wherein each pair of mirrors forming a branch of the resonator defines a common focus therebetween.

23. The gas laser of claim 19, wherein the at least one pair of folding mirrors comprise at least one of spherical and parabolic mirrors.

24. The gas laser of claim 19, wherein folding mirrors disposed at the first end of the electrodes are spaced from the first end by a distance that is substantially equal to the first distance.

25. The gas laser of claim 19, wherein said second mirror has a second mirror curvature and is spaced from the second end with respect to the longitudinal axis by a second distance and wherein said electrode curvature is configured to define said wave front curvature to substantially coincide with the second mirror curvature at the second distance, and wherein the folding mirrors disposed at the second end of the electrodes are spaced from the second end by a distance that is substantially equal to the second distance.

26. The gas laser of claim 1, wherein a length dimension of the pair of electrodes along the longitudinal axis is approximately 1600 mm, a width dimension along the wide axis is approximately 350 mm, a minimum gap distance is in the range of approximately 3.5–3.7 mm and a maximum gap distance is in the range of approximately 4.5–5 mm, and wherein the first and second distances are approximately 40 mm.

27. The gas laser claim 1, wherein a specific RF power is in the range of approximately 10–15 Watts per $cm^3$.

28. The gas laser of claim 16, wherein at least two of the plane surface portions, provided on said opposing surfaces of the pair of elongated electrodes, are electrically insulated from each other and serve as the plurality of radio frequency couplers, and wherein the excitation assembly is configured to individually selectably supply the radio frequency power to each of the coupling portions.

29. The gas laser of claim 28, wherein the excitation assembly is configured to supply a different radio frequency power to each of the radio frequency couplers, in association with a distance of a respective coupler from the surface of the opposing electrode.

30. The gas laser of claim 1, wherein the lasing gas comprises carbon dioxide.

31. The gas laser of claim 19, wherein a focal length of one of said at least two folding mirrors differs from a focal length of another one of said at least two folding mirrors.

32. The gas laser of claim 19, comprising two folding mirrors arranged to define a substantially z-shaped optical path within said resonator, each mirror in the substantially z-shaped optical path having a different focal length, each focal length selected such that the arrangement of the two folding mirrors substantially defines a rectangular active medium in the plane defined by the wide axis and the longitudinal direction.

* * * * *